United States Patent
Lange et al.

(10) Patent No.: US 11,874,122 B2
(45) Date of Patent: Jan. 16, 2024

(54) TRAVERSAL TIME PREDICTION FOR COMMON USER ROUTES

(71) Applicant: GOOGLE LLC, Mountain View, CA (US)

(72) Inventors: Oliver Lange, Mountain View, CA (US); Marc Nunkesser, Mountain View, CA (US); Seongjae Lee, Mountain View, CA (US); Todd Hester, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/057,375

(22) PCT Filed: Sep. 19, 2020

(86) PCT No.: PCT/US2020/023524
§ 371 (c)(1),
(2) Date: Nov. 20, 2020

(87) PCT Pub. No.: WO2021/133421
PCT Pub. Date: Jul. 1, 2021

(65) Prior Publication Data
US 2022/0316891 A1 Oct. 6, 2022

Related U.S. Application Data

(60) Provisional application No. 62/953,666, filed on Dec. 26, 2019.

(51) Int. Cl.
*G01C 21/34* (2006.01)
*G01C 21/36* (2006.01)

(52) U.S. Cl.
CPC ..... *G01C 21/3446* (2013.01); *G01C 21/3676* (2013.01)

(58) Field of Classification Search
CPC ............ G01C 21/3446; G01C 21/3676; G01C 21/3492; G01C 21/3484; G06N 20/00; G06Q 50/30
See application file for complete search history.

(56) References Cited

U.S. PATENT DOCUMENTS 8,606,727 B2 12/2013 Wu et al.
8,755,991 B2 6/2014 Wynter et al.
(Continued)

FOREIGN PATENT DOCUMENTS

CN 105608911 B 11/2017
JP 2003-296891 A 10/2003
(Continued)

OTHER PUBLICATIONS

International Search Report and Written Opinion for Application No. PCT/US2020/023524, dated Aug. 31, 2020.
(Continued)

*Primary Examiner* — Rami Khatib
(74) *Attorney, Agent, or Firm* — MARSHALL, GERSTEIN & BORUN LLP (57) ABSTRACT

Systems and methods are provided for predicting a traversal time for a route. A request for navigation directions is received and a route between the origin and destination is calculated. A series of route segments to be traversed on the route are identified, as well as one or more sub-series of route segments of the series of route segments, with each sub-series having route segments to be traversed consecutively on a portion of the route. For each sub-series, a sub-series traversal time is predicted based on historical traversal time data associated with historical trips where each of the route segments of the sub-series were traversed consecutively. A total route traversal time is predicted based on the sub-series traversal time. A set of navigation directions and the predicted total route traversal time are provided (Continued)

for presentation on a client device for navigating from the origin to the destination via the route.

18 Claims, 6 Drawing Sheets

(56) References Cited

U.S. PATENT DOCUMENTS

| | | | |
|---|---|---|---|
| 8,909,463 | B2 | 12/2014 | Chapman et al. |
| 9,672,735 | B2 | 6/2017 | Fowe |
| 10,078,337 | B1 | 9/2018 | Yao et al. |
| 2008/0033630 | A1 | 2/2008 | Lee et al. |
| 2009/0037100 | A1* | 2/2009 | Fujiwara .......... G08G 1/096827 701/533 |
| 2010/0106398 | A1* | 4/2010 | Eisele .................... G01C 21/20 701/532 |
| 2013/0173153 | A1 | 7/2013 | Hayashida et al. |
| 2017/0003135 | A1* | 1/2017 | Feltham ................. G01S 19/39 |
| 2017/0323249 | A1* | 11/2017 | Khasis ................. G08G 1/0129 |
| 2018/0299280 | A1* | 10/2018 | Kumar ............... G01C 21/3694 |
| 2019/0113354 | A1* | 4/2019 | Matsumura ........ G01C 21/3469 |
| 2020/0148189 | A1* | 5/2020 | Song ..................... B60W 20/12 |
| 2020/0167425 | A1* | 5/2020 | Zhang .................. G06F 16/256 |

FOREIGN PATENT DOCUMENTS

| | | |
|---|---|---|
| JP | 2005-195329 A | 7/2005 |
| JP | 2007-271481 A | 10/2007 |
| JP | 2017-076253 A | 4/2017 |

OTHER PUBLICATIONS

Zhiao et al., "T-GCN: A Temporal Graph Convolutional Network for Traffic Prediction," Journal of Latex Class Files, 14(8):1-11 (2015).

Indian Examination Report for Application No. 202247032998, dated Oct. 11, 2022.

Office Action for Japanese Patent Application No. 2022-534803, dated Aug. 21, 2023.

* cited by examiner

TRAVERSAL TIME PREDICTION FOR COMMON USER ROUTES

FIELD OF THE DISCLOSURE

The present disclosure generally relates to predicting a traversal time for a route.

BACKGROUND

When a user uses a navigation application to request navigation directions from an origin location to a destination location, a navigation application will generate a route from the origin location to the destination location that includes a series of route segments (e.g., a first segment may be driving one mile on Road A, a second segment may be turning right onto Road B and driving 0.5 miles, etc.). To predict the total traversal time, navigation applications typically predict a traversal time for each route segment and the traversal times for all of the route segments are added together, resulting in a total traversal time over the entire route.

SUMMARY

In one aspect, the present application provides a computer-implemented method for predicting a traversal time for a route, the method comprising: receiving, by a processor, a request for navigation directions, the request including an origin location and a destination location; calculating, by the processor, a route between the origin location and the destination location; determining, by the processor, a series of route segments to be traversed on the route between the origin location and the destination location; identifying, by the processor, one or more sub-series of route segments of the series of route segments, each sub-series having route segments to be traversed consecutively on a portion of the route between the origin location and the destination location; for each sub-series of route segments, predicting, by the processor, a sub-series traversal time for the sub-series of route segments based on historical traversal time data associated with historical trips in which each of the route segments of the sub-series of route segments were traversed consecutively; predicting, by the processor, a total route traversal time based on the sub-series traversal time for each sub-series of route segments; and providing, by the processor, a set of navigation directions and the predicted total route traversal time for presentation on a client device for navigating from the origin location to the destination location via the route.

In another aspect, an electronic device is provided, the electronic device comprising: one or more processors and a non-transitory computer-readable memory storing thereon instructions that, when executed by the one or more processors, cause the computing device to: receive a request for navigation directions, the request including an origin location and a destination location; calculate a route between the origin location and the destination location; determine a series of route segments to be traversed on the route between the origin location and the destination location; identify one or more sub-series of route segments of the series of route segments, each sub-series having route segments to be traversed consecutively on a portion of the route between the origin location and the destination location; for each sub-series of route segments, predict a sub-series traversal time for the sub-series of route segments based on historical traversal time data associated with historical trips in which each of the route segments of the sub-series of route segments were traversed consecutively; predict a total route traversal time based on the sub-series traversal time for each sub-series of route segments; and provide a set of navigation directions and the predicted total route traversal time for presentation on a client device for navigating from the origin location to the destination location via the route.

In yet another aspect, a non-transitory computer-readable medium is provided, the non-transitory computer-readable medium storing instructions for selecting a point of interest to include in a maneuver that, when executed by one or more processors in a computing device, cause the one or more processors to: receive a request for navigation directions, the request including an origin location and a destination location; calculate a route between the origin location and the destination location; determine a series of route segments to be traversed on the route between the origin location and the destination location; identify one or more sub-series of route segments of the series of route segments, each sub-series having route segments to be traversed consecutively on a portion of the route between the origin location and the destination location; for each sub-series of route segments, predict a sub-series traversal time for the sub-series of route segments based on historical traversal time data associated with historical trips in which each of the route segments of the sub-series of route segments were traversed consecutively; predict a total route traversal time based on the sub-series traversal time for each sub-series of route segments; and provide a set of navigation directions and the predicted total route traversal time for presentation on a client device for navigating from the origin location to the destination location via the route.

DETAILED DESCRIPTION

Overview

As discussed above, when a user uses a navigation application to request navigation directions from an origin location to a destination location, the navigation application or a server associated with the navigation application generates a route from the origin location to the destination location that includes a series of route segments. For instance, each route segment may be a section of road between two intersections (e.g., a first segment may be travelling on Road A until reaching an intersection of Road A and Road B, a second segment may be turning right onto Road B and travelling 0.5 miles until an intersection of Road B and Road C, etc.). The navigation application may predict a total traversal time for the route by aggregating or combining predicted traversal times for each route segment on the route.

However, calculating a total traversal time in this way has several limitations. First, predicted traversal times for shorter route segments are typically noisier than predicted traversal times for longer route segments, so predicted traversal times for routes that include many shorter route segments can include the accumulated noise error from each of the shorter route segments.

Furthermore, generally speaking, calculating a traversal time for an entire route based on predicted traversal times for each route segment involves an assumption that prediction errors for individual route segments are unrelated and cancel each other out. However, in many cases, prediction errors for individual route segments along the same route may be related to one another. For example, if the predicted traversal time for a specific route segment erroneously fails to account for an accident that affects the traversal time along this route segment, then it is likely that the same (unaccounted for) accident affects additional segments along the requested route, resulting in an accumulated error in the predicted traversal time along the entire route. For a route with many individual segments affected by the same error, the accumulated error can be large even if each individual error is small.

Moreover, calculating a traversal time for an entire route based on predicted traversal times for each route segment involves an assumption that a particular user's previous route segment or subsequent route segment will not affect that user's traversal time over the current route segment. However, a user's actual traversal time over a particular route segment can be affected by which previous route segment and/or subsequent route segment is included in the user's route, especially when a complex maneuver is required to take the user between these route segments. For instance, a user who needs to exit a highway at the end of a 2-mile highway segment will generally take longer to traverse the 2-mile highway segment than a user who is to continue along the highway after the 2-mile highway segment. Similarly, a user who is just entering a highway at the beginning of a 2-mile highway segment will generally take longer to traverse the 2-mile highway segment than a user who had already been on the highway prior to traversing the 2-mile highway segment. This effect is exacerbated if the highway exit or entrance is congested while traffic on the highway itself is flowing freely or vice versa.

The present application provides systems and methods for predicting a traversal time for a series of route segments rather than predicting a traversal time for each of the route segments in the series individually and adding them together. Series of route segments that are frequently traversed in a particular order may be identified as supersegments, and the traversal time over an entire supersegment may be calculated for example, using a machine learning analysis based on real-time and/or historical traversal time data from users who have traversed the supersegment, discussed in greater detail below. When a user's route includes one of the identified supersegments, the predicted traversal time for the supersegment may be used in the calculation of the total traversal time over the user's route rather than the predicted traversal times for each of the route segments that make up the supersegment.

Advantageously, calculating a predicted traversal time over an entire supersegment reduces the amount of noise in the calculation compared to calculating the predicted traversal time for a route based on the traversal times for individual route segments because supersegments are longer than individual segments. In particular, even when the calculation of a predicted traversal time over an entire supersegment includes a margin of error, the margin of error only affects the overall traversal time once, rather than adding an additional margin of error for each individual route segment. Furthermore, a predicted traversal time over an entire supersegment can account for complex maneuvers that are contained within the supersegment. That is, the predicted traversal time over a supersegment that includes route segments for entering a highway at a first mile marker and exiting the highway at a second mile marker, can be based on historical traversal times for other users who entered the highway at the first mile marker and exited the highway at the second mile marker.

The disclosed subject matter addresses technical problems associated with navigation systems and provides an improved navigation method. Real-world data relating to how users traverse different combinations of individual road segments is captured and used to determine more accurate predicted traversal times of routes presented to a user. That is, technical information relating to the underlying travel network system is obtained and used to improve predicted traversal times of routes.

Example Computing Environment

Figure 1:
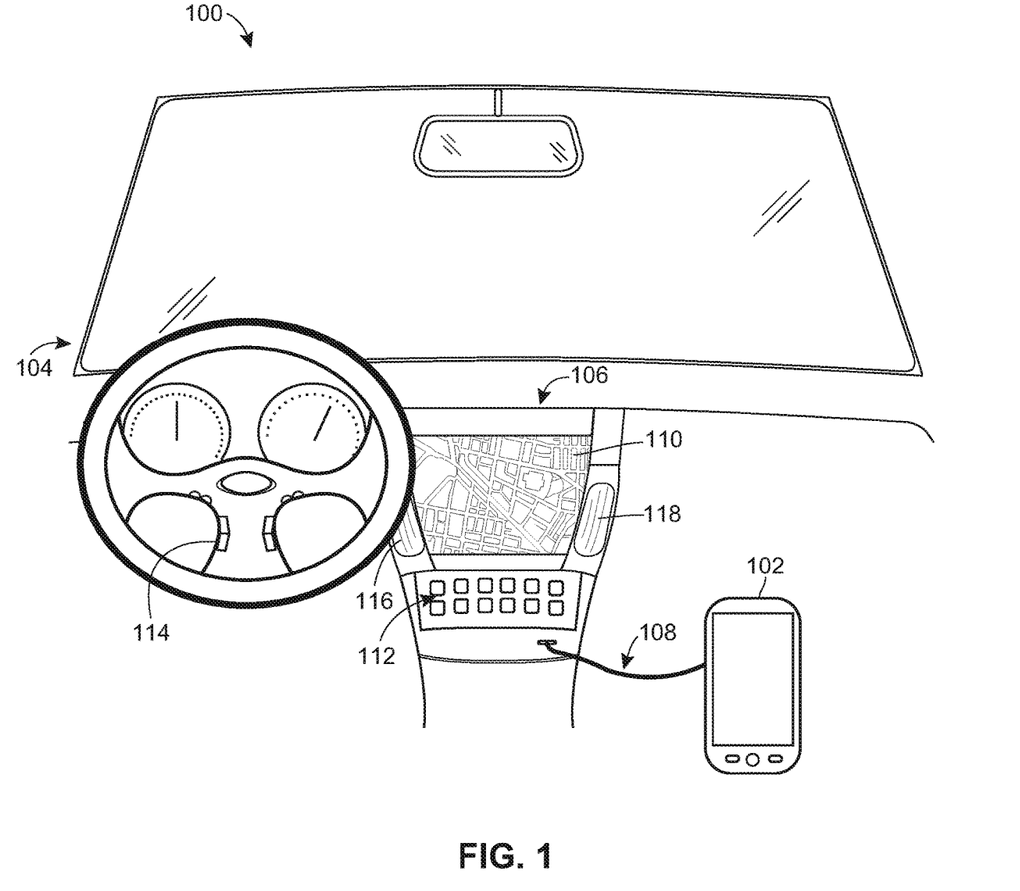
FIG. 1 illustrates an example environment in which the techniques of the present disclosure can be used for predicting a traversal time for a route generated by a navigation application executing on an electronic device.

Referring to FIG. 1, an example environment 100 in which the techniques outlined above can be implemented includes an electronic device 102 and a vehicle 104 with a head unit 106. The electronic device 102 may be a smart phone, tablet computer, wearable computer, etc. The electronic device 102 communicates with the head unit 106 of the vehicle 104 via a communication link 108, which may be wired (e.g., Universal Serial Bus (USB)) or wireless (e.g., Bluetooth, Wi-Fi Direct). The electronic device 102 also can communicate with various content providers, servers, etc. via a wireless communication network.

In operation, the electronic device 102 obtains navigation data to navigate the user from an origin location to a destination location in the form of a sequence of navigation instructions or maneuvers. As discussed in more detail below, the electronic device 102 can receive navigation data via a communication network from a navigation service or can generate navigation data locally, depending on the implementation. In some implementations, the electronic device 102 provides the head unit 106 with information related to navigation, which may include digital map images, text, and audio. The head unit 106 displays this information via a display 110. The display 110 in some implementations is a touchscreen and includes a software keyboard for entering text input, which may include the name or address of a destination, point of origin, etc. Another type of display 110 can be a screen provided along with a non-touch input device, such as a rotary controller, for example, or a separate touch pad. In general, the display 110 need not be capable of displaying both text and images. A head unit in another vehicle can include, for example, a simple display only capable of displaying alphanumeric characters on one or several lines.

The head unit 106 can include hardware input controls such as buttons, knobs, etc. These controls can be disposed on the head unit 106 or elsewhere in the vehicle 104. For example, the vehicle 104 in FIG. 1 includes navigation controls 112 on the head unit 106 as well as steering wheel controls 114 communicatively coupled to the head unit 106. The controls 112 and 114 can be mapped to a variety of navigation control functions on the electronic device 102. The controls 112 and 114 in some implementations also can be used for entering alphanumeric characters or to perform other functions for requesting navigation directions.

The vehicle 104 can also include audio input and output components, such as a microphone 116 and a speaker 118. The microphone 116 may be configured to capture voice input from a user, while the speaker 118 may be configured to communicate navigation-related information with the user. Similar to the hardware controls 112 and 114, the microphone 116 and speaker 118 can be disposed directly on the head unit 106 or elsewhere in the vehicle 104.

An example implementation of the electronic device 102 is illustrated with reference to FIG. 2. The electronic device 102 may include one or more processors 120 coupled to a memory 122, a GPS unit 124, a display 126 such as a touchscreen, one or more sensors 128 (e.g., an accelerometer, a gyroscope, an inertial measurement unit (IMU), a speedometer), one or more audio input components 130, one or more audio output components 132, and one or more communication units 134. The communication units 134 may include a short range communication unit for communicating with the head unit 106, as well as a long range communication unit. The short range communication unit may support one or more communication schemes such as USB, Bluetooth, Wi-Fi Direct, etc., while the long range communication unit may transmit and receive data via a suitable wireless network 136, such as, e.g., a 3G cellular network or a 4G cellular network. Each of the one or more processors 120 can be any suitable general-purpose processing unit (e.g., a CPU), a microprocessor, or an application-specific processing unit. The memory 122 can be a non-transitory computer-readable medium that can include persistent components such as a hard disk, a flash drive, etc. and non-persistent components such as a random access memory (RAM) unit. The processor(s) 120 and the memory 122 can be interconnected via a suitable electrical connection such as a digital bus, for example.

Using the communication units 134, the electronic device 102 may communicate with any number of suitable servers. In the example configuration of FIG. 2, the electronic device 102 communicates with a navigation server 138 that provides navigation data as well as a supersegment server 140 that provides supersegment data based on historical trip data. The navigation server 138 may include a processor 142 and a memory 144, and may be configured to access a navigation database 146 storing navigation data and/or a map database storing map data.

The supersegment server 140 may include a processor 148 and a memory 150, and may be configured to access a historical trip database 152 storing historical trip data, including, e.g., routes (i.e., series of route segments) associated with historical trips, traversal times associated with historical trips, and other information about the historical trips, such as dates and times of the historical trips, and/or weather or traffic information at the time of each historical trip. In some examples, the processor 148 of the supersegment server 140 may analyze the historical trip data to identify supersegments, i.e., frequently traveled series of route segments among historical trips. That is, for a plurality of historical routes, each including a series of route segments, a supersegment may be a sub-series of route segments that includes several route segments in the series of route segments.

In addition to identifying supersegments, the processor 148 of the supersegment server may be configured to calculate a predicted traversal time for each of the supersegments at various future times. Predicting a traversal time for a supersegment may include, for instance, averaging or otherwise weighting the traversal time over the supersegment in each of the historical routes including the supersegment, or in each of the historical routes including the supersegment traversed at a particular time of day, or particular day of the week, or in particular weather or traffic conditions.

In some examples, predicting the traversal time for the supersegment may include training a machine learning model using the historical trip data from the historical trip database 152 to identify characteristics or features of supersegments associated with various traversal times. Accordingly, in some examples, the machine learning model may be applied to data associated with a particular supersegment to predict a traversal time for the supersegment. The data associated with the particular supersegment may include characteristics of the supersegment, such as a location of the supersegment, a length of the supersegment, historical traversal time data associated with the supersegment, historical traversal time data associated with a supersegment neighboring the supersegment, current traversal time data associated with the supersegment, current traversal time data associated with each of the route segments within the supersegment, historical traversal time data associated with each of the route segments within the supersegment, current traversal time data associated with a supersegment neighboring the supersegment, a time in which the route request was made, a distance from a starting location for the route request to a location of the supersegment, types of roads for the supersegment (e.g., a highway, a one-way street, a side road, etc.), a number of traffic signals on the supersegment, a mode of transportation for traversing the supersegment, etc. The processor 148 may generate the machine learning model based on the characteristics of supersegments and the actual traversal times for the supersegments. In some implementations, each of the supersegments may be classified according to the actual traversal times for the supersegments (e.g., a first set of road segments having a first traversal time or range of traversal times may be classified into a first group, a second set of supersegments having a second traversal time or range of traversal times may be classified into a second group, etc.). The processor 148 may then analyze the characteristics of the supersegments in each group to generate the machine learning model. For example, the machine learning model may include a correlation between historical traversal times for route segments within a supersegment and historical traversal times for the supersegment. To predict the traversal time for a supersegment, the processor 148 may apply current traversal times for route segments within the supersegment to the machine learning model to predict the traversal time for the supersegment.

In any event, the processor 148 may then obtain characteristics of each supersegment on a requested route from a starting location to a destination location, such as current traversal times for each of the route segments within the supersegment. The processor 148 may apply the characteristics of the supersegment to the machine learning model using machine learning techniques. The machine learning techniques may include linear regression, polynomial regression, logistic regression, random forests, boosting such as adaptive boosting, gradient boosting, and extreme gradient boosting, nearest neighbors, Bayesian networks, neural networks, support vector machines, or any other suitable machine learning technique.

For example, when the machine learning technique is random forests, the processor 148 may collect several representative samples of each of the subsets of the training data. Using each representative sample, the processor 148 may generate a decision tree for predicting a traversal time for the supersegment. The processor 148 may then aggregate and/or combine each of the decision trees to generate the machine learning model, by for example averaging the traversal times determined at each individual tree, calculating a weighted average, taking a majority vote, etc. In some embodiments, the processor 148 may also generate decision trees when the machine learning technique is boosting.

Each decision tree may include several nodes, branches, and leaves, where each node of the decision tree represents a test on a supersegment characteristic (e.g., is the time of the request between 5 p.m. and 7 p.m.?). Each branch represents the outcome of the test (e.g., the time of the request is between 5 p.m. and 7 p.m.). Moreover, each leaf represents a different traversal time (e.g., 6 minutes), range of traversal times (e.g., 5-7 minutes), or confidence interval (e.g., 5.2-7.8 minutes with 95 percent confidence) based on the combined test outcomes for the branches which connect to the leaf.

For example, the processor 148 may generate a decision tree where a first node corresponds to whether the location of the supersegment is more than 1 mile from the starting location for the requested route. If the supersegment is not more than 1 mile from the starting location for the requested route, a first branch may connect to a first leaf node which may indicate that the traversal time is 7 minutes. If the supersegment is more than 1 mile from the starting location for the requested route, a second branch may connect to a second node which corresponds to whether the length of a neighboring supersegment differs from the length of the supersegment by less than a threshold amount.

If the length of a neighboring supersegment differs from the length of the supersegment by less than a threshold amount, a third branch may connect to a second leaf node which may indicate that the traversal time is the current traversal time for the neighboring supersegment, e.g., 12 minutes. However, if the length of a neighboring supersegment does not differ from the length of the supersegment by less than a threshold amount, a fourth branch may connect to a third leaf node which may indicate that the traversal time is 10 minutes. While the decision tree includes three leaf nodes and four branches, this is merely an example for ease of illustration only. Each decision tree may include any number of nodes, branches, and leaves, having any suitable number and/or types of tests on supersegment characteristics and/or statistical measures.

While the navigation server 138 and the supersegment server 140 are illustrated as separate servers, the navigation server 138 and the supersegment server 140 may be included within the same server device in some embodiments.

Figure 2:
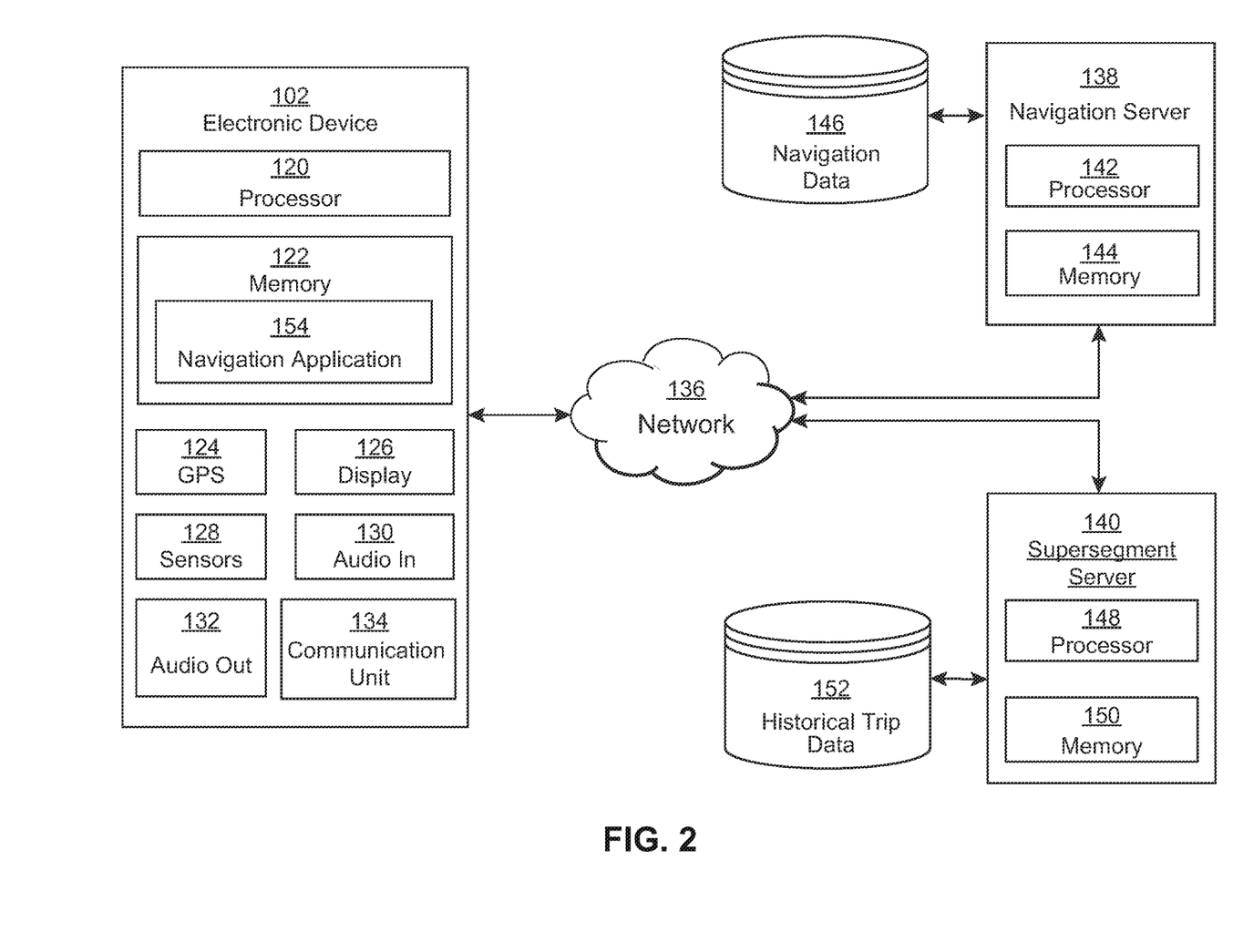
FIG. 2 is a block diagram of an example electronic device and server devices that can operate in the system of FIG. 1.

As illustrated in FIG. 2, the memory 122 of the electronic device 102 stores a navigation application 154. The navigation application 154 can include compiled instructions and/or instructions in any suitable programmable language interpretable at runtime, and executable on the one or more processors 120. Generally, the navigation application 154 generates, or receives from the navigation server 138 and/or the supersegment server 140, a route directing a driver from the current location or another starting location (e.g., an origin location) to a destination that the user has selected. As one example, the route can include a series of route segments, as well as maneuvers, each having several components, for traveling from one route segment to the next. The components within a maneuver may include a route segment component (e.g., a name or number of the road, a distance, a travel time, a speed limit, etc.), as well as an action component, (e.g., turn left, merge right, etc.) to access the next route segment.

Moreover, the navigation application 154 may calculate a predicted traversal time for the route or may obtain a predicted traversal time for the route from the supersegment server 140. In order to calculate the traversal time for the route, the navigation application 154 or the supersegment server 140 may generate or receive a predicted traversal time for a sub-series of the series of route segments (i.e., a predicted traversal time for a supersegment that is part of the route), and may calculate the traversal time for the entire series of route segments of the route based on the predicted traversal time of the sub-series of route segments.

In particular, the navigation application 154 may request or otherwise receive an indication of supersegments that are part of the route and/or predicted traversal times for each supersegment from the supersegment server 140. In some examples, the navigation application 154 may select a supersegment which is the entire route. For instance, the navigation application 154 may select the supersegment based on length (e.g., number of segments in the supersegment, or total distance covered by the supersegment) or based on the number of historical trips that include the supersegment. The navigation application 154 may combine the predicted traversal time for the selected supersegment with predicted traversal times for the remaining route segments (i.e., route segments that are part of the route but are not part of the supersegment) to calculate a predicted traversal time for the entire route. In some examples, the navigation application 154 may calculate the predicted traversal time for the entire route based on predicted traversal times for multiple supersegments that are part of the route (i.e., as well as predicted traversal times for any route segments not part of any of the multiple supersegments that are part of the route).

In other implementations, the supersegment server 140 may partition the route into supersegments and/or remaining route segments which do not overlap. The supersegment server 140 may then determine predicted traversal times for each supersegment and/or remaining route segment and may combine the predicted traversal times for the supersegment with predicted traversal times for the remaining route segments. The supersegment server 140 may then provide the predicted traversal time for the route to the navigation application 154 executing on the electronic device 102.

In any event, the navigation application 154 may display an indication of the route, a traversal time for the route, and indications of maneuvers that are part of the route for a user (e.g., a driver) via the display 110.

Example Series of Route Segments and Sub-Series of Route Segments

Figure 3A:
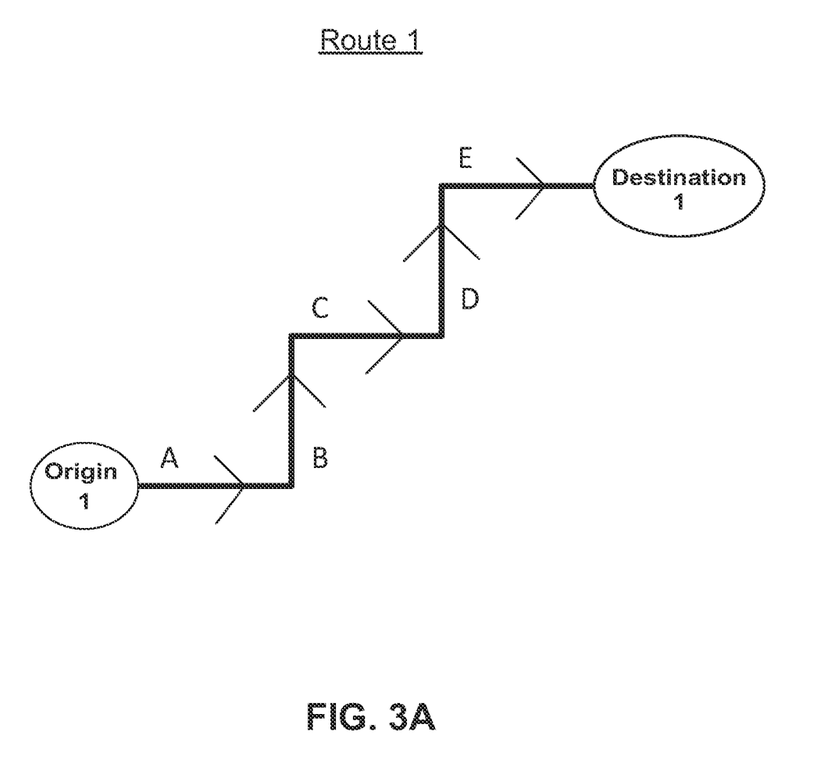
FIGS. 3A-3C are diagrams of example series of route segments and sub-series of route segments.
Figure 3B:
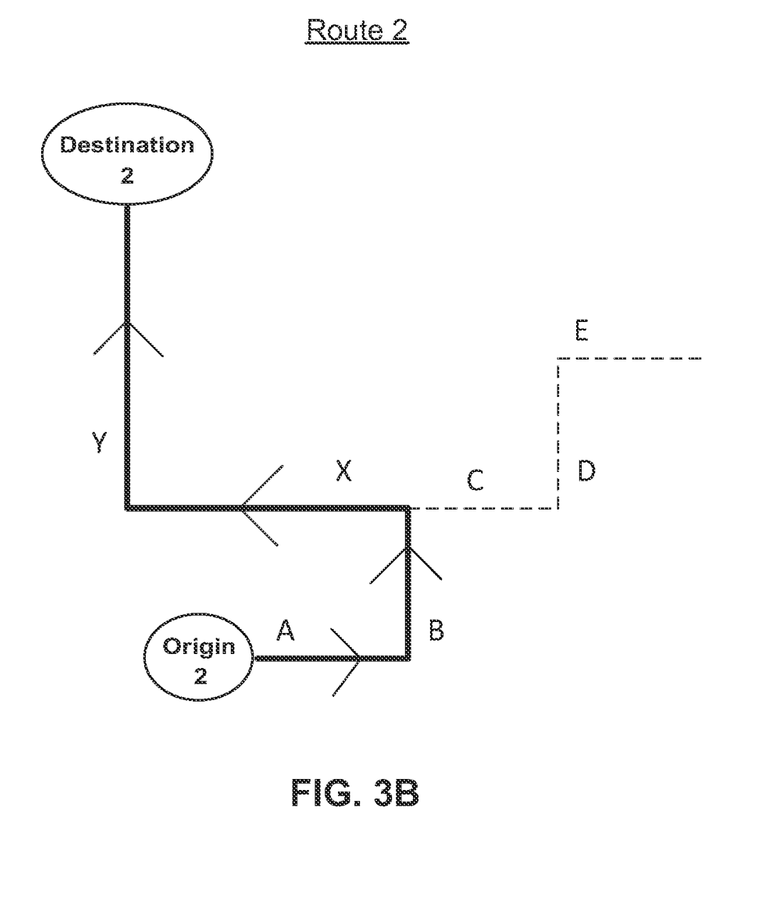
Figure 3C:
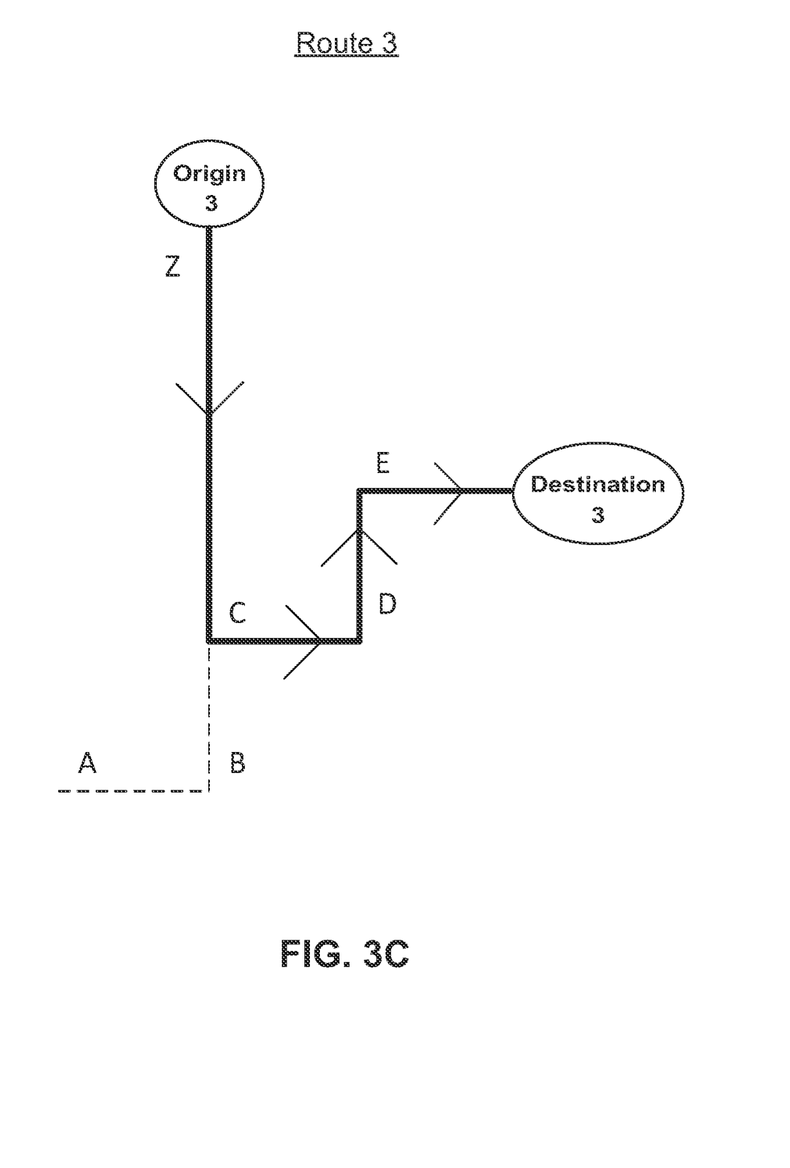

FIGS. 3A-3C are diagrams of example series of route segments and sub-series of route segments (sub-series of route segments are also interchangeably referred to as "supersegments" throughout this disclosure). For example, the series of route segments for Route 1, from Origin Location 1 to Destination Location 1, as shown in FIG. 3A, includes Route Segment A, followed immediately by Route Segment B, followed immediately by Route Segment C, followed immediately by Route Segment D, and followed immediately by Route Segment E. A sub-series of route segments for Route 1 may include Route Segment A, followed immediately by Route Segment B. As another example, a sub-series of route segments for Route 1 may include Route Segment C, followed immediately by Route Segment D, followed immediately by Route Segment E. A sub-series of route segments for a given route may include any number of route segments. In some examples, a sub-series of route segments for a route may include the entire series of route segments for the route, while in other examples, a sub-series of route segments for a route may include fewer route segments than the entire series of route segments for the route.

A sub-series of route segments that is part of one route may also be part of other routes. For instance, as shown in FIG. 3B, Route 2, from Origin 2 to Destination 2, may include Route Segment A, followed immediately by Route Segment B, followed immediately by Route Segment X, followed immediately by Route Segment Y. That is, Route 2 may also include the sub-series of Route Segment A followed immediately by Route Segment B, from Route 1. As another example, as shown in FIG. 3C, Route 3, from Origin 3 to Destination 3, may include Route Segment Z, followed immediately by Route Segment C, followed immediately by Route Segment D, followed immediately by Route Segment E. That is, Route 3 may include the sub-series of Route Segment C, followed immediately by Route Segment D, followed immediately by Route Segment E, from Route 1.

In some embodiments, the supersegment server 140 may partition series of route segments into supersegments, and may store an indication of each supersegment (e.g., Route Segment C, followed immediately by Route Segment D, followed immediately by Route Segment E) along with characteristics of the supersegment (e.g., a location of the supersegment, a length of the supersegment, historical traversal time data associated with the supersegment, historical traversal time data associated with a supersegment neighboring the supersegment, current traversal time data associated with the supersegment, current traversal time data associated with a supersegment neighboring the supersegment, a time in which the route request was made, etc.) in the historical trip database 152. Then when the supersegment server 140 retrieves a request for navigation directions from a starting location to a destination location, the supersegment server 140 may obtain an indication of a route including a series of route segments from the navigation server 138. The supersegment server 140 may compare the obtained series of route segments for the route to the supersegments stored in the historical trip database 152 to identify one or more supersegments from the historical trip database 152 that correspond to a sub-series of route segments on the route. For example, the supersegment server 140 may identify each supersegment based on length (e.g., number of segments in the supersegment, or total distance covered by the supersegment) or based on the number of historical trips that include the supersegment. Then the supersegment server 140 may predict the traversal time for the route based on predicted traversal times for each of the identified supersegments and/or predicted traversal times for remaining route segments in the obtained series of route segments for the route which are not part of any of the identified supersegments. The supersegment server 140 may predict the traversal time by combining the predicted traversal times for each of the identified supersegments and/or predicted traversal times for remaining route segments in the obtained series of route segments for the route which are not part of any of the identified supersegments in any suitable manner, such as aggregating each of the predicted traversal times.

To predict the traversal time for a supersegment, the supersegment server 140 may average or otherwise weight historical traversal times for the supersegment, historical or current traversal times for supersegments neighboring the supersegment, historical traversal times for the supersegment at a particular time of day, or particular day of the week, or in particular weather or traffic conditions. Additionally, the supersegment server 140 may adjust historical traversal times for the supersegment based on differences between historical traversal times for supersegments neighboring the supersegment and current traversal times for the neighboring supersegments. For example, if the current traversal time of a neighboring supersegment is 4 minutes longer than the historical traversal time for the neighboring supersegment, the supersegment server 140 may increase the historical traversal time for the supersegment by 4 minutes to predict the traversal time for the supersegment. In other embodiments, the supersegment server 140 may predict the traversal time for a supersegment by obtaining characteristics of the supersegment and applying the characteristics to a machine learning model for predicting traversal times of supersegments.

Example Method for Predicting a Traversal Time for a Route

Figure 4:
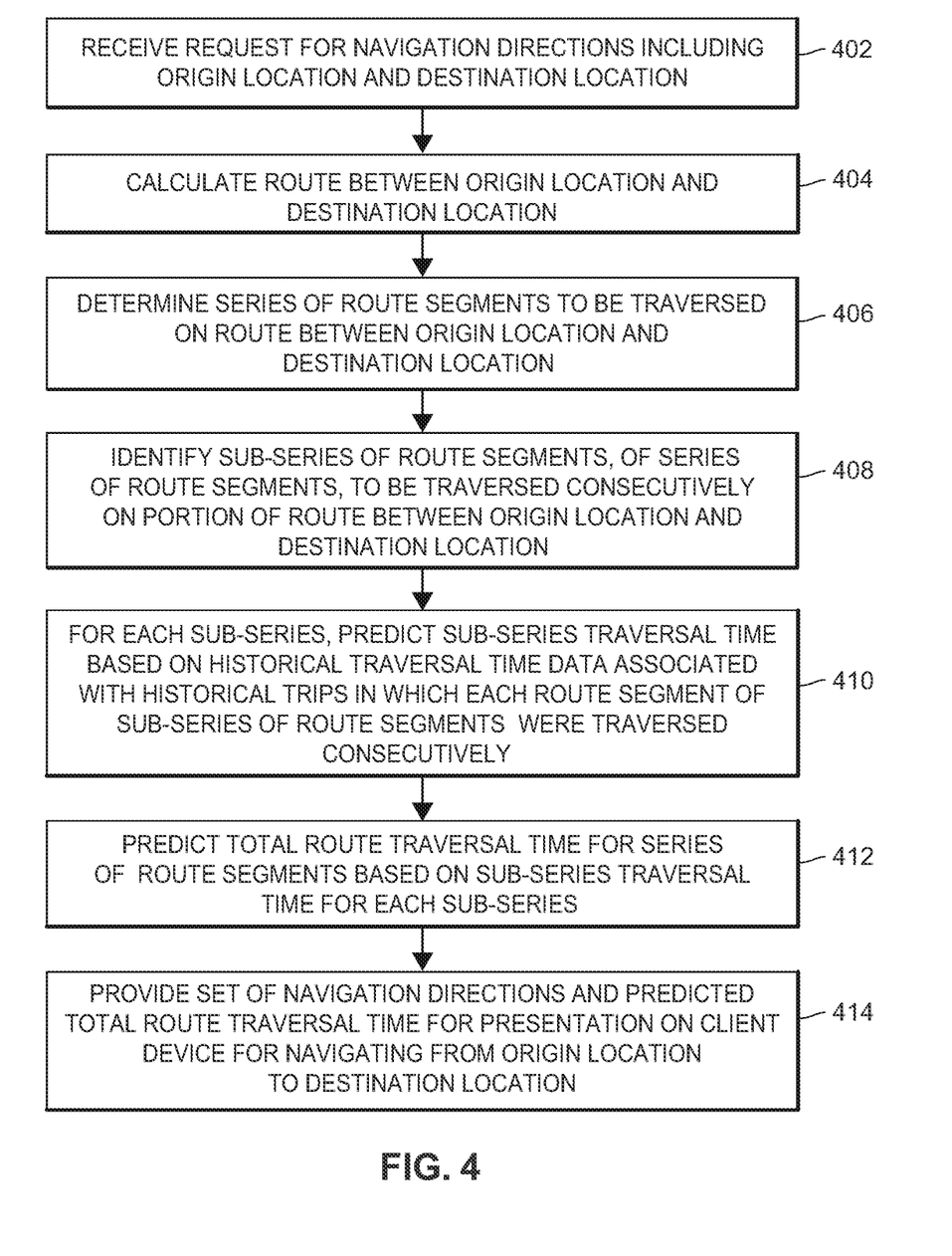
FIG. 4 is a flow diagram of an example method for predicting a traversal time for a route requested by a navigation application executing on an electronic device.

Now referring to FIG. 4, an example method 400 for predicting a traversal time for a route may be implemented by a supersegment server 140. The method 400 can be implemented as a set of instructions stored on a computer-readable memory 150 and executable on one or more processors 148 of the supersegment server 140 or another suitable computing system. In other embodiments, the method 400 may be implemented by a navigation application 154 within an electronic device 102 or by any suitable combination of the supersegment server 140 and the navigation application 154.

At block 402, a request for navigation directions, including an origin location (e.g., which may be a current location) and a destination location, may be received. In some embodiments, the request for navigation directions includes a mode of transportation for the route, such as walking, driving, biking, public transportation, etc. At block 404, a route between the origin location and the destination location may be calculated in response to the request. For example, the supersegment server 140 may transmit the request to a navigation server 138, which may in turn provide a set of navigation directions for traversing along a route from the origin location to the destination location. The route may include a series of route segments as well as maneuvers for traveling from one route segment to the next.

At block 406, the supersegment server 140 may determine the series of route segments on the route between the origin location and the destination location. In the example above, the supersegment server 140 may determine the series of route segments according to the route provided from the navigation server 138. In some examples, a route segment may be a section of the route between two maneuvers, e.g., as shown in FIGS. 3A-3C. Additionally, in some examples, a route segment may be a section of the route that has a particular length. For instance, for a route that involves driving 200 miles on a highway between maneuvers, every 5 miles (or every mile, every 10 miles, or any suitable distance) of the 200-mile stretch may be considered a separate route segment.

At block 408, the supersegment server 140 may identify one or more sub-series of route segments (of the series of route segments) to be traversed consecutively on a portion of the route between the origin location and the destination location (i.e., for use in predicting a traversal time of the route). A sub-series of route segments for a given route may include any number of route segments. In some examples, a sub-series of route segments for a route may include the entire series of route segments for the route, while in other examples, a sub-series of route segments for a route may include fewer route segments than the entire series of route segments for the route.

At block 410, for each sub-series, a sub-series traversal time may be predicted based on historical traversal time data associated with historical trips in which each route segment of the sub-series of route segments were traversed consecutively. That is, historical traversal times for a sub-series of route segments that is part of a particular route may be used to calculate a traversal time for the entire series of route segments for that route.

For instance, while there may be limited historical trip data for the entire series of route segments of a given route, there may be more historical trip data for various sub-series of the route. For instance, few users may have traversed the entire Route 1 as shown in FIG. 3A (Route Segment A to Route Segment B to Route Segment C to Route Segment D to Route Segment E), but many users may have traversed some portion of Route 1 (i.e., a sub-series of the route) as part of other routes. For instance, as shown in FIG. 3B, some users may have traversed the sub-series of Route Segment A to Route Segment B as part of Route 2, or, as shown in FIG. 3C, some users may have traversed the sub-series of Route Segment C to Route Segment D to Route Segment E as part of Route 3, and so on.

Accordingly, historical trip data for all (or some number of) trips including a particular sub-series of route segments may be analyzed to predict a traversal time for the sub-series of route segments. For instance, the traversal time for the sub-series of Route Segment C to Route Segment D to Route Segment E may be averaged over all trips including the sub-series (or over all trips at a particular time of day, on a particular day of the week, during a particular time of year, associated with a particular type of weather, etc., including the sub-series) to calculate a predicted sub-series traversal time for the sub-series. In some examples, current trip data (e.g., including current weather data or current traffic data) for trips including the particular sub-series of route segments may also be analyzed to predict the traversal time for the sub-series of route segments.

In some examples, a machine learning model may be trained using the historical trip data to identify characteristics or features of the sub-series of route segments that are related to various traversal times. The trained machine learning model may be applied to characteristics of a particular sub-series of route segments to predict the sub-series traversal time.

At block 412, a total route traversal time may be predicted for the series of route segments based on the sub-series traversal time for one or more sub-series of the series of route segments. In some examples, the predicted sub-series traversal time for a sub-series of the series of route segments may be added to the individual predicted traversal times for the other route segments (e.g., based on historical trip or current trip data for the other route segments) of the series of route segments to predict a traversal time for entire series of route segments.

For instance, using the example of Route 1, as shown in FIG. 3A, a total route traversal time for Route 1's series of Route Segment A to Route Segment B to Route Segment C to Route Segment D to Route Segment E may be calculated based on a predicted traversal time for the sub-series of Route Segment A to Route Segment B. For example, the predicted traversal time for the sub-series of Route Segment A to Route Segment B may be added to a predicted traversal time for Route Segment C, a predicted traversal time for Route Segment D, and a predicted traversal time for Route Segment E to predict a traversal time for the series of Route Segment A to Route Segment B to Route Segment C to Route Segment D to Route Segment E.

Additionally, in some examples, the predicted sub-series traversal time for multiple sub-series of the series of route segments may be combined to predict a traversal time for the entire series of route segments. For example, the predicted traversal time for the sub-series of Route Segment A to Route Segment B may be added to the predicted traversal time for the sub-series of Route Segment C to Route Segment D to Route Segment E to predict a traversal time for the series of Route Segment A to Route Segment B to Route Segment C to Route Segment D to Route Segment E.

In some examples, a particular sub-series of route segments may be selected for use in predicting the total route traversal time based on various factors, such as the length of the sub-series (e.g., the number of route segments in the sub-series, or the total length of the sub-series in miles or km), or the number of historical trips that include the sub-series (e.g., whether the number of historical trips that include the sub-series is greater than a threshold number of trips). That is, if only one sub-series of route segments was to be used to predict the total traversal time for a route, a longer sub-series may be selected rather than a shorter sub-series. Similarly, a sub-series associated with a greater number of historical trips may be selected rather than a sub-series associated with a smaller number of historical trips.

In some implementations, the supersegment server 140 may periodically predict the total route traversal time (e.g., every minute, every two minutes, every five minutes, etc.) to generate an updated prediction of the total route traversal time. In this manner, the supersegment server 140 may generate updated predictions to account for changes in traffic or other conditions.

At block 414, a set of navigation directions and a predicted total route traversal time may be provided for presentation on a client device for navigating from the origin location to the destination location. For example, the navigation application 154 may present the set of navigation direction and the predicted total route traversal time on the display 126 of the electronic device 102. The supersegment server 140 may also provide the updated predicted total route traversal times for presentation on the client device as the user traverses the route.

ADDITIONAL CONSIDERATIONS

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

A hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for predicting traversal times for routes through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for predicting a traversal time for a route, the method comprising:
    receiving, by a processor, a request for navigation directions, the request including an origin location and a destination location;
    determining, by the processor, a route between the origin location and the destination location including a series of route segments to be traversed on the route between the origin location and the destination location, and corresponding maneuvers between the route segments of the series;
    identifying, by the processor, one or more sub-series of route segments of the series of route segments, each sub-series having route segments to be traversed consecutively on a portion of the route between the origin location and the destination location, and the corresponding maneuvers between the route segments of the sub-series;
    for each sub-series of route segments, predicting, by the processor, a sub-series traversal time for the sub-series of route segments based on historical traversal time data associated with historical trips in which each of the route segments of the sub-series of route segments, and the corresponding maneuvers between the route segments of the sub-series, were traversed consecutively;
    predicting, by the processor, a total route traversal time based on the predicted sub-series traversal time for each sub-series of route segments and based on a predicted traversal time associated with one or more route segments that are included in the series of route segments and not included in any of the one or more sub-series of route segments; and
    providing, by the processor, a set of navigation directions and the predicted total route traversal time for presentation on a client device for navigating from the origin location to the destination location via the route.

2. The computer-implemented method of claim 1, wherein identifying the one or more sub-series of route segments includes:
    identifying, by the processor, a plurality of sub-series of route segments of the series of route segments, each route segment of each of the plurality of sub-series of route segments to be traversed consecutively on a portion of the route between the origin location and the destination location;
    analyzing, by the processor, historical trips to determine, for each of the plurality of sub-series of route segments, a number of historical trips in which each of the route segments of the sub-series of route segments were traversed consecutively; and
    selecting, by the processor, a sub-series of route segments from the plurality of sub-series of the route segments based on the number of historical trips in which each of the route segments of the sub-series of route segments was traversed consecutively.

3. The computer-implemented method of claim 2, wherein selecting the sub-series of route segments includes selecting the sub-series of route segments from the plurality of sub-series of the route segments based on whether the number of historical trips in which each of the route segments of the sub-series of route segments was traversed consecutively is greater than a threshold number of historical trips.

4. The computer-implemented method of claim 2, wherein selecting the sub-series of route segments includes selecting the sub-series of route segments from the plurality of sub-series of route segments based on the number of route segments in each of the plurality of sub-series of route segments.

5. The computer-implemented method of claim 1, wherein predicting the sub-series traversal time includes predicting the sub-series traversal time for each sub-series of route segments further based on historical or current traversal time data associated with one or more route segments included in the series of route segments and not included in the sub-series of route segments.

6. The computer-implemented method of claim 1, wherein predicting the sub-series traversal time includes predicting the sub-series traversal time for each sub-series of route segments further based on historical or current traversal time data associated with one or more route segments that are not included in the sub-series of route segments.

7. The computer-implemented method of claim 1, wherein the union of selected sub-series of route segments contains fewer route segments than the series of route segments.

8. The computer-implemented method of claim 1, wherein predicting a traversal time for a route segment is based on one or more of:
   (i) historical traversal time data associated with the route segment;
   (ii) historical traversal time data associated with another route segment, the other route segment being previous to the route segment or subsequent to the route segment in the series of route segments;
   (iii) current traversal time data associated with the route segment; or
   (iv) current traversal time data associated with another route segment, the other route segment being previous to the route segment or subsequent to the route segment in the series of route segments.

9. The computer-implemented method of claim 1, wherein predicting the sub-series traversal time for each sub-series of route segments includes:
   training, by the processor, a machine learning model using one or more of: (i) characteristics of sub-series of route segments, including historical traversal times for route segments within each sub-series of route segments, and (ii) historical traversal times for each sub-series of route segments;
   for each of the one or more sub-series of route segments:
   identifying, by the processor, characteristics of the sub-series of route segments including current traversal times for route segments within the sub-series of route segments; and
   applying, by the processors, the machine learning model to the characteristics of the sub-series of route segments to predict the sub-series traversal time.

10. A computing device comprising: one or more processors and a non-transitory computer-readable memory storing thereon instructions that, when executed by the one or more processors, cause the computing device to:
    receive a request for navigation directions, the request including an origin location and a destination location;
    determine a route between the origin location and the destination location including a series of route segments to be traversed on the route between the origin location and the destination location, and corresponding maneuvers between the route segments of the series;
    identify one or more sub-series of route segments of the series of route segments, each sub-series having route segments to be traversed consecutively on a portion of the route between the origin location and the destination location, and the corresponding maneuvers between the route segments of the sub-series;
    for each sub-series of route segments, predict a sub-series traversal time for the sub-series of route segments based on historical traversal time data associated with historical trips in which each of the route segments of the sub-series of route segments, and the corresponding maneuvers between the route segments of the sub-series were traversed consecutively;
    predict a total route traversal time based on the predicted sub-series traversal time for each sub-series of route segments and based on a predicted traversal time associated with one or more route segments that are included in the series of route segments and not included in any of the one or more sub-series of route segments; and
    provide a set of navigation directions and the predicted total route traversal time for presentation on a client device for navigating from the origin location to the destination location via the route.

11. The computing device of claim 10, wherein the instructions cause the computing device to identify the one or more sub-series of route segments by:
    identifying a plurality of sub-series of route segments of the series of route segments, each route segment of each of the plurality of sub-series of route segments to be traversed consecutively on a portion of the route between the origin location and the destination location;
    analyzing historical trips to determine, for each of the plurality of sub-series of route segments, a number of historical trips in which each of the route segments of the sub-series of route segments were traversed consecutively; and
    selecting a sub-series of route segments from the plurality of sub-series of the route segments based on the number of historical trips in which each of the route segments of the sub-series of route segments was traversed consecutively.

12. The computing device of claim 11, wherein the instructions cause the computing device to select the sub-series of route segments from the plurality of sub-series of the route segments based on whether the number of historical trips in which each of the route segments of the sub-series of route segments was traversed consecutively is greater than a threshold number of historical trips.

13. The computing device of claim 11, wherein the instructions cause the computing device to select the sub-series of route segments from the plurality of sub-series of route segments based on the number of route segments in each of the plurality of sub-series of route segments.

14. The computing device of claim 10, wherein the instructions cause the computing device to predict the sub-series traversal time for each sub-series of route segments further based on historical or current traversal time data associated with one or more route segments included in the series of route segments and not included in the sub-series of route segments.

15. The computing device of claim 10, wherein the instructions cause the computing device to predict the sub-series traversal time for each sub-series of route segments further based on historical or current traversal time data associated with one or more route segments that are not included in the sub-series of route segments.

16. The computing device of claim 10, wherein each sub-series of route segments contains fewer route segments than the series of route segments.

17. The computing device of claim 10, wherein the instructions cause the computing device to predict a traversal time for a route segment based on one or more of:
    (i) historical traversal time data associated with the route segment;
    (ii) historical traversal time data associated with another route segment, the other route segment being immediately previous to the route segment or immediately subsequent to the route segment in the series of route segments;
    (iii) current traversal time data associated with the route segment; or (iv) current traversal time data associated with another route segment, the other route segment being immediately previous to the route segment or immediately subsequent to the route segment in the series of route segments.

18. A non-transitory computer-readable medium storing instructions for selecting a point of interest to include in a maneuver that, when executed by one or more processors in a computing device, cause the one or more processors to:
receive a request for navigation directions, the request including an origin location and a destination location;
determine a route between the origin location and the destination location including a series of route segments to be traversed on the route between the origin location and the destination location, and corresponding maneuvers between the route segments of the series;
identify one or more sub-series of route segments of the series of route segments, each sub-series having route segments to be traversed consecutively on a portion of the route between the origin location and the destination location, and the corresponding maneuvers between the route segments of the sub-series;
for each sub-series of route segments, predict a sub-series traversal time for the sub-series of route segments based on historical traversal time data associated with historical trips in which each of the route segments of the sub-series of route segments, and the corresponding maneuvers between the route segments of the sub-series, were traversed consecutively;
predict a total route traversal time based on the predicted sub-series traversal time for each sub-series of route segments and based on a predicted traversal time associated with one or more route segments that are included in the series of route segments and not included in any of the one or more sub-series of route segments; and
provide a set of navigation directions and the predicted total route traversal time for presentation on a client device for navigating from the origin location to the destination location via the route.

* * * * *